(No Model.)
W. GURLEY, Dec'd.
M. K. GURLEY, Executrix.
TELESCOPIC HAND LEVEL.
No. 360,805. Patented Apr. 5, 1887.
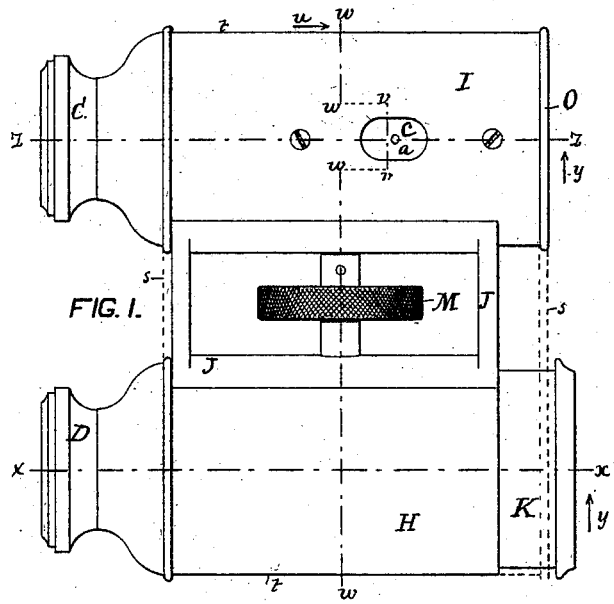
FIG. 1.
FIG. 2.
FIG. 3.
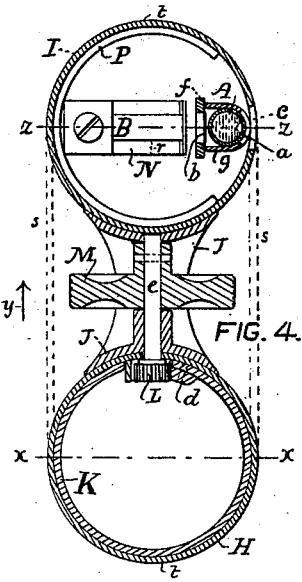
FIG. 4.
FIG. 5.
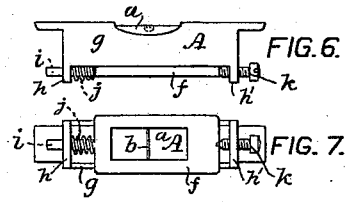
FIG. 6.
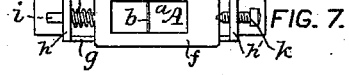
FIG. 7.
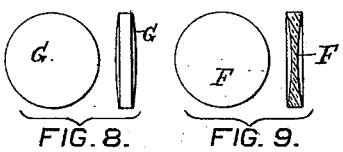
FIG. 8.   FIG. 9.
WITNESSES.
Edward L. Stout
Austin F. Park
INVENTOR:
William Gurley.
Maria K. Gurley,
Executrix.
N. PETERS. Photo-Lithographer, Washington, D. C.

UNITED STATES PATENT OFFICE.

MARIA K. GURLEY, OF TROY, NEW YORK, (EXECUTRIX OF WILLIAM GURLEY, DECEASED,) ASSIGNOR TO W. & L. E. GURLEY, OF SAME PLACE.

TELESCOPIC HAND-LEVEL.

SPECIFICATION forming part of Letters Patent No. 360,805, dated April 5, 1887.

Application filed January 31, 1887. Serial No. 225,956. (No model.)

*To all whom it may concern:*

Be it known that I, MARIA K. GURLEY, a citizen of the United States, residing in the city of Troy, in the county of Rensselaer and State of New York, am the executrix of the last will and testament of WILLIAM GURLEY, late a citizen of the United States, and a resident of said city, county, and State, deceased, and that said WILLIAM GURLEY in his lifetime invented certain new and useful Improvements in Hand-Levels, of which the following is a specification, reference being had to the accompanying drawings.

The general object of this invention is to produce a very short, compact, efficient, durable, easily-adjustable, and well-incased telescopic hand-level having a very large and clear field of view, and by which an engineer or surveyor can quickly take preliminary or approximate levels while holding the instrument in hand by using one of his eyes in seeing through one magnifying eye-piece the reflected image of the bubble of the spirit-level and its index, and simultaneously using his other eye in observing through the telescope a distant object magnified and in apparent coincidence with the index and bubble of the spirit-level.

In the aforesaid drawings, Figure 1 is a plan of one of the improved telescopic leveling-instruments or binocular hand-levels. Fig. 2 is an inside elevation and longitudinal section of the same instrument at the line $z\ z$ in Figs. 1 and 4, and viewed in the direction of the arrow $y$ in those figures. Fig. 3 is an inside elevation and longitudinal section of the telescope portion of the same instrument at the line $x\ x$ in Figs. 1 and 4, and viewed in the direction of the arrow $y$. Fig. 4 is an inside elevation and transverse section of the same instrument at the lines $w\ w\ v\ v$ in Figs. 1, 2, and 3, and seen in the direction of the arrow $u$ in those figures. Fig. 5 is an isometrical drawing of the reflector and its adjustable carrier or holder in the same instrument. Fig. 6 is a side elevation, and Fig. 7 a plan, of the under side of the spirit-level and its adjustable index in the same instrument. Figs. 8 and 9 show side and edge elevations of the convex and concave lenses in the two-eye-pieces of the instrument represented by Figs. 1, 2, and 3.

One distinguishing feature of this invention is a leveling-instrument embracing a telescope, a spirit-level, as A, lengthwise with the telescope, and having the middle portion of its glass $a$ exposed at top and bottom and furnished with a cross-wire, mark, line, or index, as $b$, and with an inclined or angular reflector, as B, opposite to the middle exposed part of the spirit-level, and an eye-piece, as C, at the same end of the instrument as and about even with the eye-piece, as D, of the telescope, and at about the same distance from the latter as the two eyes of a person are apart from each other, and directed toward the reflector in a line parallel or nearly parallel to the optical axis of the telescope, so that a person holding the instrument in hand can by one of his eyes see through the eye-piece which is directed toward the reflector, the index or its reflected image, and the reflected image of the bubble of the spirit-level, and can by his other eye simultaneously see through the telescope a distant object magnified and in apparent coincidence with the spirit-level bubble and index. In carrying out this feature of the invention the lenses in the telescope and in the eye-piece which is directed toward the reflector can be of any suitable known kinds.

To secure the largest and clearest field of view through the telescope and not invert the image of an object seen through it, and to greatly lessen the length and cost of the instrument, the telescope has a suitable object-glass, as E, and a concave eye-lens, as F, which can be doubly concave, as shown in Figs. 3 and 9, or suitably plano-concave, and the eye-piece, which is directed toward the reflector, has a convex lens, as G, which can be double convex, as shown in Figs. 2 and 8, or suitably plano-convex or concavo-convex.

As regards the above-described features of this invention, the lenses of the telescope and the spirit-level, index, reflector, and eye-piece directed toward the reflector can all be mounted, wholly or partially, within only one case, which can be semi-cylindrical at its ends and flat at top and bottom, about as indicated in Figs. 1 and 4 by full and dotted lines at $t\ t$ and $s\ s$.

To cheaply, nicely, and effectually incase and protect the lenses of the telescope and the spirit-level, reflector, index, and eye-piece for viewing the reflector by means which shall permit the instrument to be very conveniently held and used in hand, the lenses of the telescope are secured to and in a tubular case, as H, and the spirit-level, index, reflector, and eye-piece for viewing the reflector are secured to and in a second tubular case, as I, which has in one side a light-aperture, as c, opposite to the middle part of the spirit-level, and the latter case is secured to the case of the telescope, and with the axes of the two cases parallel or nearly parallel and at about the same distance apart as the two eyes of a person by an intervening frame or stock, as J, attached to the two cases by screws or other suitable means.

To provide means for easily adjusting the object-glass of the telescope while the instrument is held by hand to the eyes in use, so as to clearly see by one eye through the telescope objects at any desired different distances from the instrument while the other eye is viewing the image of the spirit-level bubble and its index through the eye-piece, which is directed toward the reflector, the forward portion of the case H of the telescope is made cylindrical, and the object-glass, as E, is mounted in a cylindrical slide, as K, which fits closely in the case, and has a lengthwise rack, as d, furnished with a pinion, L, which is mounted to turn to and fro in the instrument, and has fast on its shaft e a head, M, in the space between the two cases, where it is well protected, and can be easily turned to and fro to operate the pinion, and thereby the rack-slide and object-glass by the thumb and fingers of either hand holding the instrument to the eyes.

In carrying out the above-described parts of this invention one or both of the eye-pieces may or may not be adjustable toward and from the reflector and the object-glass, respectively; also, the index for the bubble of the spirit-level can be either fixed or made adjustable at various points—as, for instance, at r on the reflector B, or on its holder N, or on the under side of the exposed middle part of the spirit-level, or wherever the spirit-level bubble and the index can be clearly seen in apparent coincidence and centrally through the eye-piece directed toward the reflector. The cross-wire or index is, however, commonly arranged directly between the spirit-level and the reflector, and is made adjustable in the lengthwise direction of the instrument and spirit-level and in relation to the reflector and the eye-piece directed toward the reflector by some suitable means. For this purpose, in the instrument represented by the drawings, the index or cross-wire b is secured to and carried by a slide, f, which fits against the lower side edges of the casing g of the spirit-level between downward lugs h h' on the casing, and has at one end a stem, i, extending through a perforation in the lug h, and through an intervening expansive spring, j, and an adjusting-screw, k, extends through a threaded perforation in the lug h', and has its pointed end in a corresponding socket in the adjacent end of the slide.

To prevent dust and light from entering the forward end of the case I, and to permit convenient access to the adjusting devices of the spirit-level index, the forward end of the case is provided with a suitable removable cap, O, Fig. 2, secured to the case by a screw-connection, m, or by other suitable known means.

The reflector can be a glass triangular prism having a right angle and two angles each of forty-five degrees, as shown, or the reflector can be a plano-cylindrical or a flat mirror inclined at an angle of about forty-five degrees to the plane of the spirit-level, as indicated at g in Figs. 2 and 5.

To properly secure the reflector opposite to the naked middle part of the under side of the spirit-level, and to have the reflector readily adjustable in respect to the spirit-level, index, and eye-piece directed toward the reflector, the case I is made in the form of a hollow cylinder, and the reflector is mounted on a segmental slide, P, Figs. 4 and 5, which fits closely within and is held by its outward spring-pressure securely against more than half of the circumference of the case, so that by suitable pressure applied to the slide it with the reflector can be moved to and fro lengthwise and circumferentially, and thereby properly adjusted in the case.

The instrument can be adjusted for use by first setting the reflector in proper position in respect to the spirit-level and the eye-piece, which is directed toward the reflector, sighting by one eye through the telescope at a distant point known to be in the same horizontal plane as the two eyes of the person, and turning the adjusting-screw of the index, and thereby adjusting the index so that its image and the image of the spirit-level bubble seen by the other eye through the eye-piece directed toward the reflector both appear in coincidence with or horizontally adjacent to the distant point seen through the telescope.

What is claimed as the invention of the said WILLIAM GURLEY is—

1. A leveling-instrument embracing a telescope and a spirit-level furnished with an index and inclined reflector and an eye-piece, so combined that a person by one of his eyes can see through said eye-piece the index or its reflected image and the reflected image of the bubble of the spirit-level, and can by his other eye simultaneously see through the telescope a distant object magnified and in apparent coincidence with the bubble of the spirit-level and index, substantially as set forth.

2. A leveling-instrument embracing a telescope having an object-glass and a concave eye-lens, and a spirit-level furnished with an index, an inclined reflector, and a convex eye-lens, so combined that a person can by one eye see through the convex eye-lens the index or its reflected image and the reflected image of the bubble of the spirit-level, and can by his other eye simultaneously see through the concave eye-lens and the object-glass of the telescope a distant object magnified and in apparent coincidence with the index and bulb of the spirit-level, substantially as described.

3. A leveling-instrument embracing a telescope having a tubular case, and another tubular case lengthwise with, apart from, and secured to the case of the telescope, and having in one side a light-aperture, a spirit-level, index, and inclined reflector, all within the case and opposite to said light-aperture, and at one end of the case, and at the same end of the instrument as the eye-piece of the telescope, an eye-piece directed toward the reflector, substantially as set forth.

4. A leveling-instrument embracing a telescope having a tubular case, with an eye-piece having only a concave lens, and another tubular case lengthwise with, apart from, and secured laterally to the case of the telescope, and having a light-aperture in one side, a spirit-level index and inclined reflector within the case and opposite to its said light-aperture, and at the same end of the instrument as the eye-piece of the telescope an eye-piece having a convex lens directed toward the reflector, substantially as set forth.

5. A leveling-instrument embracing a telescope having a tubular case, and an object-glass carried by a slide fitting in the case and furnished with a lengthwise rack, another tubular case lengthwise with, apart from, and secured to the case of the telescope and furnished with a spirit-level, index, inclined reflector, and an eye-piece at the same end of the instrument as the eye-piece of the telescope, and a pinion engaging with said rack and having a turning-head in an open space between the two tubular cases, substantially as set forth.

6. In a leveling-instrument, a tubular case having a light-aperture in one side, a spirit-level within the case and secured thereto opposite to the light-aperture, an inclined reflector within the case and opposite to the spirit-level, an eye-lens in one end of the case and directed toward the reflector, and an index directly between the reflector and spirit-level and adjustable independently of and in respect to the spirit-level and the reflector, substantially as described.

7. In a leveling-instrument, a tubular case having a light-aperture in one side, a spirit-level within the case and secured thereto opposite to the light-aperture, an inclined reflector within the case and opposite to the spirit-level, an index directly between the spirit-level and reflector and adjustable lengthwise of the spirit-level, an eye-lens at one end of the case and directed toward the reflector, and at the other end of the case a light-excluding removable cap, substantially as described.

8. In a leveling-instrument, a cylindrical case having a light-aperture in one side, a spirit-level secured lengthwise within and to the case and opposite to said light-aperture, an inclined reflector within the case opposite to the spirit-level and carried by a slide fitting and adjustable lengthwise and circumferentially in the case, an eye-lens in one end of the case and directed toward the reflector, and an index directly between the reflector and spirit-level, substantially as set forth.

9. In a leveling-instrument, a cylindrical case having a light-aperture in one side, a spirit-level lengthwise within the case and secured thereto opposite to said aperture, an inclined reflector within the case opposite to the spirit-level and carried by a slide fitting and adjustable lengthwise in the case, an eye-lens in one end of the case and directed toward the reflector, and an index directly between the reflector and spirit-level and adjustable in the lengthwise direction of the latter, substantially as set forth.

In testimony whereof I hereunto set my hand in the presence of two subscribing witnesses, this 27th day of January, 1887.

MARIA K. GURLEY,
*Executrix of William Gurley, deceased.*

Witnesses:
EDWARD L. STOUT,
AUSTIN F. PARK.